Oct. 10, 1933.　　　　M. D. LEE　　　　1,930,144
PHOTOGRAPHIC FILM SPOOL
Filed Nov. 16, 1932　　　　2 Sheets-Sheet 1

Inventor:
Maynard D. Lee,
By Newton Perrins
Ronald H. Stewart
Attorneys.

Oct. 10, 1933.          M. D. LEE          1,930,144
PHOTOGRAPHIC FILM SPOOL
Filed Nov. 16, 1932          2 Sheets-Sheet 2
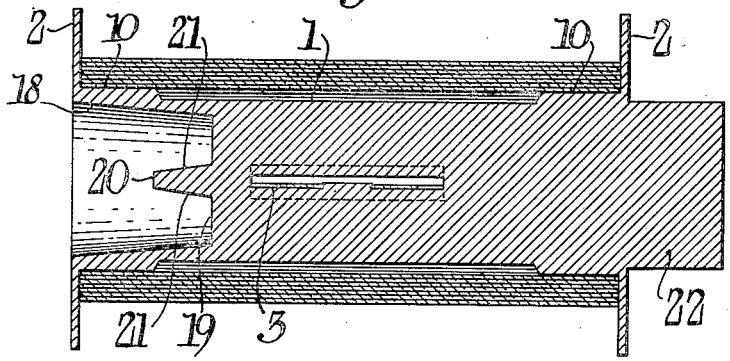
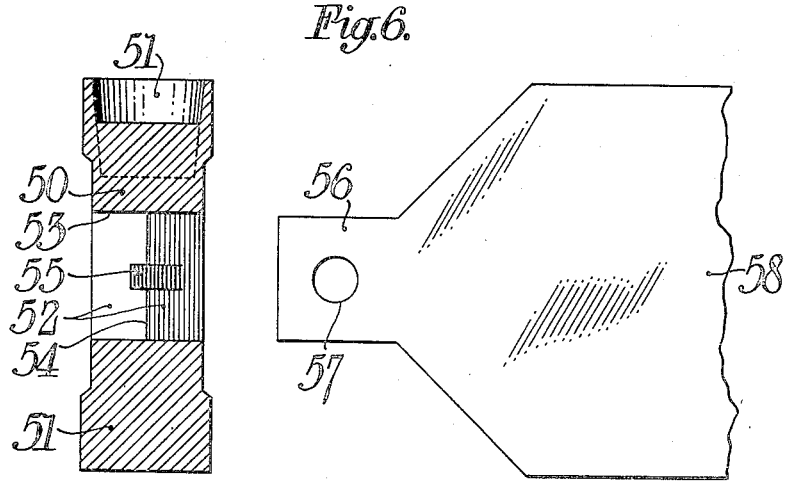
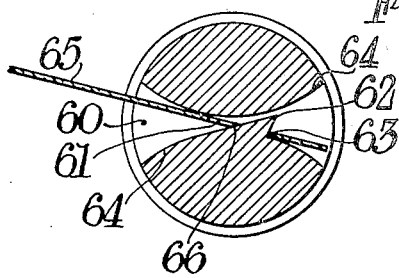
Inventor:
Maynard D. Lee,
By Newton M Perrine
Donald H. Stewart,
Attorneys Patented Oct. 10, 1933

1,930,144

UNITED STATES PATENT OFFICE 1,930,144

PHOTOGRAPHIC FILM SPOOL

Maynard D. Lee, Rochester, N. Y., assignor to Eastman Kodak Company, Rochester, N. Y., a corporation of New York Application November 16, 1932
Serial No. 642,922

16 Claims. (Cl. 242—74)

This invention relates to photography, and more particularly to photographic film supports. One object of my invention is to provide a film supporting structure to which the end of film or film backing paper can be readily attached. Another object of my invention is to provide a film spool with a relatively wide slot into which the end of strip material can be readily inserted and from which the strip material may be spaced to prevent offset marks. Another object of my invention is to provide a film spool which can be readily made from die-cast or molded material. Another object of my invention is to provide a film spool to which a strip of photographic film can be attached and from which the strip is removable only with difficulty. Another object of my invention is to provide a film hub with a slot tapering in width from each end toward the center. Still another object of my invention is to provide a film core with a slot tapering from each end toward the center and in which there is a hook-like projection which materially closes a portion of the narrowest portion of the slot causing the end of an apertured film to snap over the hook-like projection, and other objects will appear from the following specification, the novel features being particularly pointed out in the claims at the end thereof.

In certain cameras now on the market utilizing narrow film in relatively short lengths for making a series of small exposures thereon, it is necessary to attach the film strip to the hub or to the film spool very securely in order to move the film properly through the camera. This is particularly true where the film is automatically measured in the camera, as by a sprocket wheel engaging apertures in the film, or otherwise.

The preferred form of my invention is particularly adapted for small sized camera spools and will be described particularly for that use, although it is obvious that spools of any size and type may be made in accordance with my invention.

Coming now to the drawings wherein like reference characters denote like parts throughout, Fig. 1 is a perspective view of a film spool and a piece of strip material adapted to be attached to the film spool constructed in accordance with and embodying a preferred form of my invention.

Fig. 5 is a cross section through a spool as shown in Fig. 2 but with convolutions of film wound thereon.

Fig. 6 is a longitudinal section through a film supporting hub constructed in accordance with a second embodiment of my invention.

Fig. 7 is a cross section of a hub having a slot constructed in accordance with a third embodiment of my invention.

Figure 1:
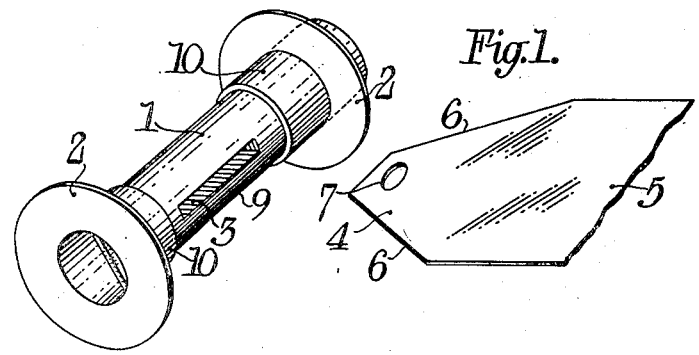
Figure 2:
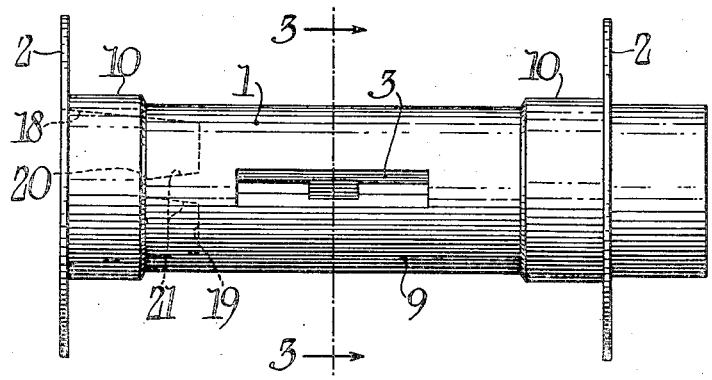
Fig. 2 is a side elevation of the film spool shown in Fig. 1.

In the following specification where I refer to a hub, I refer to either a hub with flanges forming the spool, such as shown in the drawings, and supporting convolutions of film to make what is ordinarily termed "a film cartridge" or I refer to a hub without flanges, since such a hub can readily be attached to some of the film magazines now on the market.

The material to be wound on the hub may be either film alone, or film with backing paper.

In the preferred embodiment of my invention, shown in Fig. 1, the film support may comprise a hub member 1 having flanges 2 connected to each end of the hub and a slot 3 into which the end 4 of a film strip 5 may be entered. The end 4 of the film strip is preferably provided with tapered walls 6 and is provided with an aperture 7 in the end.

Figure 3:
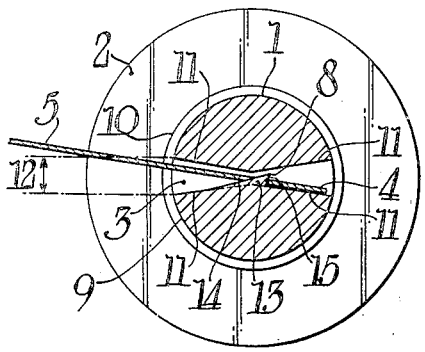
Fig. 3 is a section on line 3—3 of Fig. 2.
Figure 4:
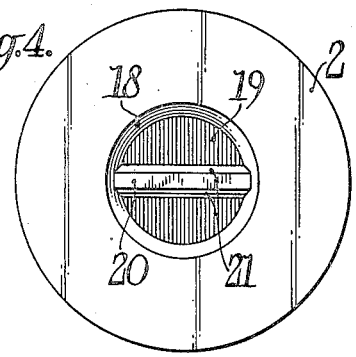
Fig. 4 is an end elevation of the film spool shown in Fig. 2.

This aperture in the film is adapted to engage and be held by a hook-like projection 8 which lies substantially in the center of the film core 1, as best shown in Fig. 3.

The film core 1 may consist of a comparatively solid cylindrical member having a smaller diameter along the major portion of its length 9 than at its ends 10 where a raised pad is provided. This raised pad is for the purpose of slightly spacing the inner convolution of film from the major portion of the film hub and need only be of slightly greater diameter than portion 9 of the film hub.

The film slot designated broadly as 3 is of the same length throughout the hub but differs in width. As best indicated in Fig. 3, the slot 3 is actually composed of a plurality of converging walls 11 which at the periphery of the hub 1 are spaced apart a distance 12 which is greater than the spacing at 13 at the center of the hub. Thus the walls 11 converge toward the center from the outside of the hub. This construction has a number of advantages. It provides a wide opening into which the end 4 of the strip material can be readily inserted and provides a relatively narrow throat at the center of the hub through which the film must pass. Since the film must pass through the narrow slot in the center, it has a tendency to be guided through an accurate path at this point.

At the center of the hub a hook 8 is provided, this hook being of substantially the same width throughout and being composed of a wall 14 arranged at an angle to a wall 11 and a second wall 15 which forms a hook-like projection adapted to engage an aperture 7 in the film.

This hook-like projection is extremely simple to thread since when the end of the backing paper 4 is thrust through the wide end of the slot the converging walls direct the end 4 through the narrow path 13 and the end of the film will snap over the hook-like projection 8. Since the angle of the wall 15 is acute with respect to the angle of one of the walls 11, the end of the film will tend to be retained securely to the hub member 1.

Ordinarily, it is a disadvantage to have a film spool slot of substantial width in a film hub because as the convolutions of film or film and backing paper are wound upon the hub, offset marks ordinarily occur, due to the pressure of the edge of the slot on the successive layers of film. However, with a hub constructed in accordance with the preferred embodiment of my invention, the pads 10 on the ends of the film hub 1 are of greater diameter than the central portion of the hub which contains the slot and consequently the film bridges across the slot and there is no possibility of having the edges of the slot produce pressure marks on the film.

The film hub 1 may be substantially solid in construction except for the slot 3 and the hub may have an aperture 18 at one end comprising cone-shaped walls which taper down to a bottom 19. A flange 20 also having tapering walls 21 may extend across the cone-shaped opening in such a way that a driving device for the film spool may enter and by engaging the flange may turn the hub.

As above explained, the film hub may have flanges 2 attached to the hub, and I also contemplate using an extension or trunnion 22 on that end of the film spool hub which lies opposite the aperture 18.

It is my intention to manufacture the film support shown in the drawings of some moldable composition such as cellulose acetate, bakelite or the like, although the shape of the spool also particularly lends itself to die-casting.

It will be noted that with a slot and a hook of the type shown in the drawings, it is a comparatively simple matter to make a mold, the core of which will readily draw from the slot.

The film spool should preferably be made from a light, moldable composition. If, however, a die-casting is to be made, the spool can be considerably lightened by reducing the amount of metal in the core. This can be done by coring out the end 22 which serves for a handle and a hollow portion could be provided which would extend down nearly to the slot 3. When a small sized spool is made of a light moldable composition, such as cellulose acetate, the weight is so little that it is not necessary to reduce the amount of material in the spool.

A second embodiment of my invention is shown in Fig. 6 wherein a hub is provided for supporting convolutions of film, this hub omitting the flanges shown in the other figures. If it should be desirable to more accurately locate the film or backing paper with respect to the hub, the construction shown in Fig. 6 may be employed. In Fig. 6 the hub member 50 is cylindrical and, as in the other figures, is provided with end pads 51 of slightly greater diameter than the major portion of the hub. The slot 53 which extends through the hub is made of the same width throughout as in the first described embodiment of my invention and comprises pairs of tapering walls 52 which taper in width from the outside where the width is greatest to the inside where the width is much less than the outer edge of the slot.

These walls may converge along a central line 54 and there may be a hook 55 projecting to one side of the center. Film or other strip material may be accurately guided into place on a hub of this type by providing an end tongue 56 on the film which is of substantially the same width as the width of the slot. The end 56 may be provided with an aperture 57 and the strip material 58 may be threaded into the spool by merely thrusting the end 56 into the slot a sufficient distance for the aperture 57 to engage the hook 56.

In Fig. 6 I have shown the slot 53 to be similar in every way to the slot shown in the preceding figures. However, it is not necessary that the walls of the slot should be flat planes which converge toward the center. In Fig. 7 I show in section a modified form of hub in which the slot is like that shown in the preceding figures in that the outer edge of the slot 60 is of much greater width than the center 61 of the slot and in that the curved wall 62, which forms with wall 63 the hook member, is a wall which gradually decreases the width of the slot as this wall approaches the hook. This type of film slot can be used satisfactorily and will tend to immediately snap an apertured film 65 into position with the aperture 66 engaging the hook by thrusting the film down in the direction shown by the arrow.

In the different embodiments of my invention so far described, the film supporting hub includes a slot which is formed by walls so shaped that the two outer edges of the slot are materially wider than the central part of the slot and the central part of the slot is of such width that the strip material is accurately guided at this point. The wide slot entrance provides an opening into which film can readily be entered and the gradually narrowing walls of the slot provide an accurate guideway to direct the film to the hook and to cause the aperture in the film to snap over the hook. The raised core edges permit a wide slot to be used without pressure marking film.

I do not wish to confine myself to any definite width for the slot because this will naturally vary with the thickness of the strip material used. However, a spool support will function very smoothly in which the width of the narrowest portion of the slot is only two or three times the width of the material which is to be used on the support, since this will accurately guide the film into a place in which the aperture will readily snap over the hook. Moreover, where the central part of the slot is relatively narrow there is much less chance of the perforated film becoming accidentally disengaged from the hook. This is particularly true because in the embodiments of my invention shown, the hook closes up approximately half the total width of the narrow portion of the slot.

It is obvious that various modifications can be made in the form and shape of the film spool hub without departing from my invention. I contemplate as within the scope of my invention all such forms as may come within the terms of the appended claims.

What I claim as new and desire to be secured by Letters Patent of the United States is:

1. A film support comprising a cylindrical member, a hook carried by the cylindrical member on the interior thereof about equally spaced from the periphery of said cylindrical member, and a guideway leading from the exterior of the cylindrical member to the hook, said guideway comprising film guiding walls closer together at the hook than at the periphery of the cylindrical member whereby an apertured film may be easily entered into the guideway and directed to the hook.

2. A film support comprising a cylindrical member, a hook carried by the cylindrical member on the interior thereof about equally spaced from the periphery of said cylindrical member, and a guideway leading from the exterior of the cylindrical member to the hook, said guideway comprising film guiding walls closer together at the hook than at the periphery of the cylindrical member, said hook being so dimensioned that the thickness of the hook partially closes a portion of said guideway.

3. A film support comprising a cylindrical member, a hook carried by the cylindrical member on the interior thereof about equally spaced from the periphery of said cylindrical member, and a guideway leading from the exterior of the cylindrical member to the hook, said guideway comprising film guiding walls closer together at the hook than at the periphery of the cylindrical member, said hook being so dimensioned that the thickness of the hook partially closes a portion of said guideway and an inclined wall connects the hook to the guideway and is adapted to guide a film to said hook.

4. A film support comprising a cylindrical member, a hook carried by the cylindrical member on the interior thereof at substantially right angles to the axis of said cylindrical member, a guideway leading from the periphery of the cylindrical member to the hook, said guideway decreasing in width as it approaches said hook, said hook partially closing the narrowest portion of said guideway, said guideway increasing in width beyond the narrowest portion of the guideway, said hook lying to one side of the narrowest portion of said guideway.

5. In a photographic film support the combination with a hub, of a guideway for strip material integrally formed in said hub and leading from the outside of said hub into the interior thereof, said guideway comprising oppositely disposed tapering walls of progressively decreasing width toward the axis of said hub.

6. A film support comprising a hub member, a guideway for the film including a slot extending through the hub member, said guideway including walls extending through the hub, said walls being spaced apart near the periphery of the hub a distance greater than the spacing of the walls near the axis of said hub.

7. A film support comprising a hub member, a guideway for the film including a slot extending through the hub member, said guideway including walls extending through the hub, said walls being spaced apart near the periphery of the hub a distance greater than the spacing of the walls near the axis of said hub and a hook-like projection near the narrow portion of said slot.

8. A film support comprising a hub member, a guideway for the film including a slot extending through the hub member, said guideway including walls extending through the hub, said walls being spaced apart near the periphery of the hub a distance greater than the spacing of the walls near the axis of said hub, and a hook-like projection formed of angularly disposed walls one of which partially closes a portion of the narrowest portion of said guideway.

9. A film support comprising a hub member, a guideway for the film including a slot extending through the hub member, said guideway including walls extending through the hub, said walls being spaced apart near the periphery of the hub a distance greater than the spacing of the walls near the axis of said hub, whereby said walls taper toward each other and toward the axis of said hub, and a hook-like projection extending from a wall of the slot and at an angle to said wall adapted to partially close a narrow portion of said slot.

10. In a film support, the combination with flanges, of a slotted hub supporting said flanges, said slot being included between two pairs of walls converging from the outside of the hub member toward the center thereof.

11. In a film support, the combination with flanges, of a slotted hub supporting said flanges, said slot being included between two pairs of walls converging from the outside of the hub member toward the center thereof, said walls being spaced apart at the outside of the hub at least twice the distance they are spaced apart at the center of said hub.

12. In a film support, the combination with flanges, of a slotted hub supporting said flanges, said slot being included between two pairs of walls converging from the outside of the hub member toward the center thereof and a hook-like projection located at substantially the center of said hub.

13. In a film support, the combination with flanges, of a slotted hub supporting said flanges, said slot being included between two pairs of walls converging from the outside of the hub member toward the center thereof and a hook-like projection located at the narrow portion of the slot and substantially in the center thereof.

14. In a film support, the combination with flanges, of a slotted hub supporting said flanges, said slot being included between two pairs of walls converging from the outside of the hub member towards the center thereof and a hook-like projection unsymmetrically placed with respect to said converging walls whereby an apertured strip thrust into said wide portion of the slot may be directed to the hook.

15. In a film support, the combination with flanges, of a slotted hub supporting said flanges, said slot being included between two pairs of walls converging from the outside of the hub member toward the center thereof and a hook-like projection unsymmetrically placed with respect to said converging walls and located near the narrowest portion of the said converging walls.

16. A film spool hub comprising a cylindrical, relatively solid hub member having a slot extending completely through the hub, said slot being wider at the ends than at the center portion thereof.

MAYNARD D. LEE.